(12) United States Patent
Luo et al.

(10) Patent No.: US 9,973,780 B2
(45) Date of Patent: May 15, 2018

(54) SCALED VIDEO FOR PSEUDO-ANALOG TRANSMISSION IN SPATIAL DOMAIN

(71) Applicant: MICROSOFT TECHNOLOGY LICENSING, LLC, Redmond, WA (US)

(72) Inventors: Chong Luo, Beijing (CN); Hao Cui, Beijing (CN); Ruiqin Xiong, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 14/069,101

(22) Filed: Oct. 31, 2013

(65) Prior Publication Data

US 2015/0117537 A1 Apr. 30, 2015

(51) Int. Cl.
*H04B 1/66* (2006.01)
*H04N 7/12* (2006.01)
*H04N 11/02* (2006.01)
*H04N 11/04* (2006.01)
*H04N 19/615* (2014.01)

(52) U.S. Cl.
CPC .................. *H04N 19/615* (2014.11)

(58) Field of Classification Search
CPC ............... H04N 19/615; H04N 19/625; H04N 19/00787; H04N 19/00812
See application file for complete search history.

(56) References Cited

U.S. PATENT DOCUMENTS

| | | | |
|---|---|---|---|
| 7,817,717 | B2 | 10/2010 | Malayath et al. |
| 8,023,562 | B2 | 9/2011 | Zheludkov et al. |
| 8,086,052 | B2 | 12/2011 | Toth et al. |
| 8,165,202 | B1 | 4/2012 | Yonemoto et al. |
| 8,331,434 | B2 | 12/2012 | Han |

(Continued)

OTHER PUBLICATIONS

Wang, H., A. Divakaran, A. Vetro, S-F. Chang, and H. Sun (Survey of compressed-domain features used in audio-visual indexing and analysis, J. Visual Communication and Image Representation 14 doi:10.1016/S104703203 (03)00019-1, 2003, 150-183).*

(Continued)

*Primary Examiner* — Mohammed Rahaman
*Assistant Examiner* — Richard A Hansell, Jr.
(74) *Attorney, Agent, or Firm* — Schwegman Lundberg & Woessner, P.A.

(57) ABSTRACT

Scaled video for pseudo-analog transmission in the spatial domain is described. Boundaries are determined for M L-shaped chunks of coefficients of at least one frequency-transformed video frame of a group of pictures (GOP). The boundaries are determined based at least on variances of the coefficients of the M L-shaped chunks, such as by reducing or minimizing the sum of the square roots of the variances of the coefficients. Corresponding power scale factors for the M L-shaped chunks are determined based at least partly on the variances of the coefficients of the M L-shaped chunks, and the coefficients of the M L-shaped chunks are scaled using the corresponding power scale factors. The pixel values of the frames (e.g., the frames in the spatial domain) are transmitted on a pseudo-analog channel. At the receiver, retained spatial redundancy enables denoising in the spatial domain prior to de-scaling in the frequency domain.

18 Claims, 8 Drawing Sheets

(56) References Cited

U.S. PATENT DOCUMENTS

| | | | |
|---|---|---|---|
| 8,374,238 B2 | 2/2013 | Xiong et al. | |
| 2005/0117638 A1* | 6/2005 | Turaga | H04N 19/63 375/240.01 |
| 2006/0013310 A1 | 1/2006 | Lee et al. | |
| 2006/0078050 A1* | 4/2006 | Chen | H04N 19/63 375/240.11 |
| 2006/0274958 A1* | 12/2006 | Lopez | H04N 19/70 382/240 |
| 2008/0112481 A1 | 5/2008 | Hsaing et al. | |
| 2009/0213926 A1* | 8/2009 | Shin | G06F 17/147 375/240.2 |
| 2010/0008416 A1* | 1/2010 | Ben-Zedeff | H04N 7/152 375/240.02 |
| 2010/0232521 A1* | 9/2010 | Hagendorf | H04N 21/234327 375/240.26 |
| 2010/0310186 A1* | 12/2010 | Liu | H04N 19/176 382/239 |
| 2012/0275510 A1* | 11/2012 | Jakubczak | H04N 19/146 375/240.02 |

OTHER PUBLICATIONS

Wiegand, T., G.J. Sullivan, G. Bjontegaard, and A. Luthra, "Overview of the H.264/AVC Video Coding Standard", IEEE Transactions on Circuits and Systems for Video Technology, vol. 13. 13, No. 7, Jul. 2003.*

Weigand, T., G.J. Sullivan, G. Bjontegaard, and A. Luthra, "Overview of the H.264/AVC Video Coding Standard", IEEE Transactions on Circuits and Systems for Video Technology, vol. 13, No. 7, Jul. 2003.*

Jakubczak S. and D. Katabi, "A cross-Layer Design fopr Scalable Mobile Video", MobiCom' 11, Sep. 19-23, 2011, Las Vegas, Nevada, USA, Copyright 2011 ACM 978-1-4503-0492-4/11/09.*

Wang, H., A. Divakaran, A. Vetro, S-F. Chang, and H. Sun (Survey of compressed-domain features used in audio-visual indexing and analysis, J. Visual Communication and Image Representation 14 doi:10.1016/SI 04703203 (03)00019-1,2003, 150-183).*

Guo, et al., "An Encoder-Embedded Video Denoising Filter Based on the Temporal LMMSE Estimator", IEEE International Conferenc on Multimedia and Expo, Jul. 2006, pp. 841-844.

Jakubczak, et al., "A Cross-Layer Design for Scalable Mobile Video", MobiCom'11, Sep. 2011, pp. 289-300.

* cited by examiner

SCALED VIDEO FOR PSEUDO-ANALOG TRANSMISSION IN SPATIAL DOMAIN

BACKGROUND

Conventional video compression removes both temporal redundancy (similarities between adjacent frames) and spatial redundancy (similarities within a single frame) from video in order to reduce the amount of data that is stored and/or transmitted. In the conventional digital transmission paradigm, transmission is assumed to be lossless as long as channel coding provides sufficient protection (e.g., error correction). However, video degradation in noisy environments is not graceful; at low Signal-to-Noise Ratio (SNR), the video cannot be reproduced resulting in choppy or stalled video reproduction at the receiver.

In a unicast arrangement the transmitter adjusts video quality to accommodate the receiver's channel condition. In a multicast environment the transmitter either sends individual transmissions to all receivers (to accommodate their individual channel conditions), or the transmitter transmits video according to the worst channel condition of all receivers. The first method increases bandwidth usage while the second method results in reduced video quality.

An analog video system named SoftCast has been proposed by S. Jakubczak and D. Katabi. ("A cross-layer design for scalable mobile video," In Proceedings of the 17th annual international conference on Mobile computing and networking, MobiCom '11, pages 289-300.) In Softcast 3D-DCT (Discrete Cosine Transform) is performed on a group of pictures, and the transform coefficients are transmitted as the I and Q components of a complex symbol after power scaling. Most of the temporal and spatial redundancy is retained. Such a scheme is capable of achieving graceful degradation in a wide range of channel conditions, making it suitable for multicast.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present application utilize a pseudo-analog transmission system that retains spatial redundancy to enable a video signal to be denoised by a receiver. To enable denoising at the receiver, embodiments of the present disclosure transmit pixels of video frames—i.e., the video frames are transmitted in the spatial domain rather than the frequency domain. In order to transmit in the spatial domain while maintaining a bandwidth budget, embodiments of the present application take advantage of a characteristic of Direct Cosine Transform (DCT), namely that L-shaped lines of coefficients removed from the periphery of a video frame in the frequency domain results in down-sampled video frame in the spatial domain—thereby reducing the bandwidth used to transmit it. Also, in order to power scale the coefficients in the frequency domain under the constraint of a total power budget, prior to transmission, while also accommodating the removal of the L-shaped lines of coefficients for bandwidth reduction, embodiments utilize an adaptive approach to identifying L-shaped chunks of coefficients that increases the scaling factors that can be used for power scaling the video frames. Increasing the scaling factors results in improved reproduction of the video at the receiver, compared with using smaller scaling factors.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments include transmitters and receivers configured to transmit pseudo-analog video. As mentioned above, a proposed system called SoftCast retains both temporal and spatial redundancy and transmits scaled frequency coefficients of the video in an analog fashion. Thus, the video quality in SoftCast degrades gracefully as channel conditions degrade, similar to old-fashioned analog television. Embodiments of the present application utilize a pseudo-analog transmission system that retains spatial redundancy (the redundancy found within video frames) while filtering out temporal redundancy (the redundancy found between adjacent video frames). The retained spatial redundancy enables the video signal to be denoised by the receiver.

To enable denoising at the receiver, embodiments of the present disclosure transmit pixels of the video frames—i.e., the video frames are transmitted in the spatial domain rather than the frequency domain. In order to transmit in the spatial domain while maintaining a bandwidth budget, embodiments remove L-shaped lines of coefficients removed from the periphery of a video frame in the frequency domain, which results in a down-sampled video frame in the spatial domain and reduced bandwidth usage. Also, embodiments utilize an adaptive approach to identifying L-shaped chunks of coefficients in the frequency domain that increases the scaling factors that can be used to scale the video frames under a given total power budget. Increasing the scaling factors results in improved reproduction of the video at the receiver, compared with using smaller scaling factors.

The processes, systems, and devices described herein may be implemented in a number of ways. Example implementations are provided below with reference to the following figures.

Example Environment

Figure 1:
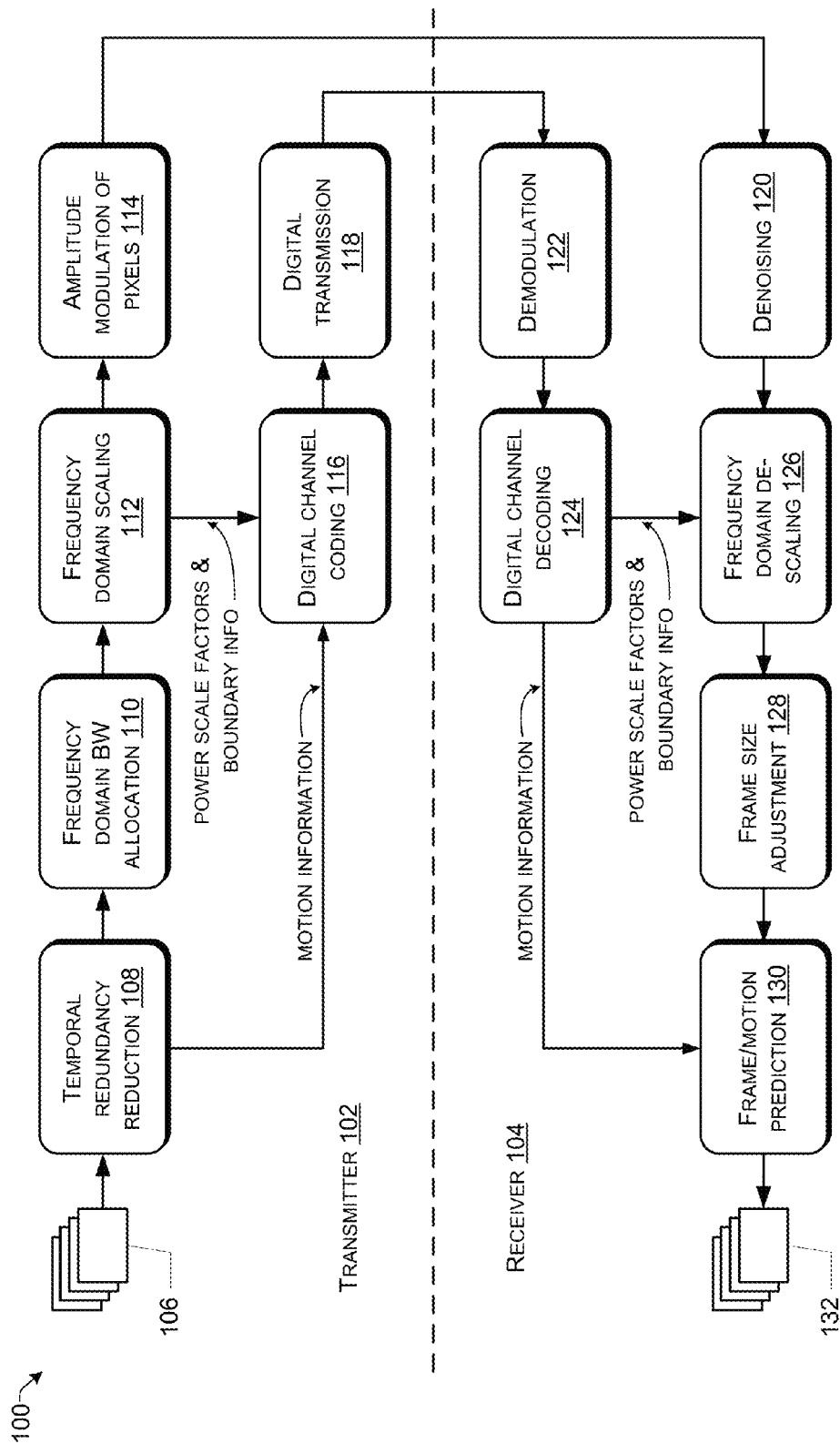
FIG. 1 is a block diagram of an example environment for transmitting power-scaled video in the spatial domain via pseudo-analog transmission.

FIG. 1 is a block diagram of an example environment 100 for transmitting power-scaled video in the spatial domain via pseudo-analog transmission. A transmitter 102 is configured to be in communication with a receiver 104 to transmit video, such as real-time video. In real-time video, the transmission is modified to fit into a bandwidth budget that enables the video to be displayed at the receiver as it is received. An original group of pictures (GOP) 106 represents a set of contiguous or adjacent video frames of an overall video transmission. The video frames in the GOP 106 may include, according to various embodiments, various numbers of frames, but typical GOPs include 4, 8, 16, or other number of video frames.

Temporal redundancy reduction 108 is performed on the video frames of the GOP 106 in order to remove temporal redundancy between the frames. An open-loop prediction method is used, such as motion-compensated temporal filtering (MCTF) as is discussed in more detail elsewhere within this Detailed Description. Temporal redundancy is reduced in the GOP 106, while spatial redundancy is preserved. Preserving the spatial redundancy in the GOP 106 enables de-noising at the receiver.

Frequency domain bandwidth (BW) allocation 110 is performed on the GOP 106. The GOP 106 is first converted into the frequency domain using Discrete Cosine Transform (DCT) for each frame. DCT has certain properties that make it useful for bandwidth reduction. As will be discussed in more detail later, removing L-shaped lines of coefficients from the frequency transformed frames of the GOP 106, such as until a bandwidth budget is met, results in down-sampled frames once the video frames are converted back to the spatial domain. This results in lower bandwidth usage.

Frequency domain scaling 112 is performed on the GOP 106. As will be discussed in more detail elsewhere within this Detailed Description, the transmitter 102 determines M L-shaped chunks of frequency coefficients for one or more of the video frames, where M is an integer. The boundaries of the M L-shaped chunks of coefficients are identified such that the scaling factors used to scale the coefficients during frequency domain scaling 112 are increased or maximized under a total power constraint.

The larger the power scaling factors, the better the video reproduction at the receiver in the case of noisy channel conditions. This can be illustrated with an example. If two coefficients are 5.0 and 10.0, and they are scaled by a factor of 5 (resulting in scaled values of 25 and 50), then a ±0.5 error introduced in the analog or pseudo-analog transmission may result in values received of 24.5 and 50.5, respectively. When those values are de-scaled (again by a factor of 5), the resulting numbers will be 4.9 and 10.1. However, if the values are scaled by a factor of 10 before transmission (resulting in values of 50 and 100, respectively), and the same ±0.5 error is introduced in the transmission, then the values received may be 49.5 and 100.5, respectively. Once those values are de-scaled (by a factor of 10), the resulting values will be 4.95 and 10.05. These values are closer to the original values of 5.0 and 10.0 than are the resulting values scaled only by a factor of 5 (4.9 and 10.1). Thus, increasing or maximizing the scaling factors, within a given total power budget constraint, may result in more accurate reproduction at the receiver.

As will be discussed in more detail elsewhere within this Detailed Description, the M L-shaped chunks of coefficients of the video frames of the GOP are identified during the frequency domain scaling 112 such that the coefficients within the L-shaped chunks are relatively similar (have reduced or minimized variances), which will enable larger power scaling factors for those chunks. L-shaped chunks are utilized for two reasons. First, frequency domain bandwidth allocation 110 removes L-shaped lines of coefficients from the periphery of the video frames. Thus, L-shaped chunks more easily accommodate the resulting bandwidth-adjusted video frames. Secondly, the frequency coefficients of a video frame decay rapidly from low-frequency to high-frequency, and those belonging to similar frequency band are more likely to have similar values.

Amplitude modulation of pixels 114 is performed to transmit the pixel values (i.e., the video frames in the spatial domain) to the receiver 104. Thus, inverse frequency transform is performed on the frequency coefficients of the video frames of the GOP 106 prior to amplitude modulation of pixels 114 in order to convert the video frames back to pixel values. The transmission of the pixel values via amplitude modulation includes, in various embodiments, a pseudo-analog transmission, which utilizes a discrete modulation constellation that it is much denser than commonly used 16-QAM or 64-QAM, such as from $2^{24}$-QAM to $2^{28}$-QAM. Pseudo-analog implementation enables the video transmission to be integrated into a conventional network stack. The scaled pixel values in a pseudo-analog transmission are transmitted as I and Q components of a complex symbol.

In addition, metadata such as motion information produced by the temporal redundancy reduction 108, as well as power scale factors and boundary information produced by the frequency domain scaling 112, are digitally transmitted. Digital channel coding 116 is followed by digital transmission 118 of the metadata. These digital transmissions are low-bandwidth. Sufficient error protection is utilized to ensure lossless transmission in high-noise environments.

At the receiver 104, the amplitude modulated pixel values of the GOP 106 are received. Denoising 120 of the received pixel values is performed. In embodiments, two types of denoising are performed, as will be described in more detail elsewhere within this Detailed Description. A median filter is used to handle packet losses; in this type of filtering, which assumes that packet losses result in randomly dispersed pixel "holes" in a frame, the median of the surrounding pixel values (e.g., the surrounding eight pixel values) are used to fill in the holes. To reduce randomly introduced noise, in various embodiments, a block-matching and 3D filtering (BM3D) algorithm is utilized.

Demodulation 122 and digital channel decoding 124 are performed on the received digital signal that accompanies the received pseudo-analog signal.

Frequency domain de-scaling 126 is performed on the denoised frames using the power scale factors and boundary information received via the digital channel. The frames are first transformed into the frequency domain using the same frequency transform used at the transmitter 102 (e.g., DCT) and then de-scaled using the power-scale factors and boundary information, before the frames are transformed back into the spatial domain.

Because one or more of the frames may be down-sampled at the transmitter 102 in order to meet a bandwidth budget, one or more of the de-scaled frames may be down-sampled. Thus, frame size adjustment 128 is performed on the down-sampled frames. The frame size adjustment 128 determines whether a frame is smaller than a predetermined frame size—e.g., whether the frame is the same size as the expected video frame size—and if not, the frame size adjustment 128 pads the DCT coefficients with zeros to increase the frame size. Other frame size adjustment techniques besides zero padding may be used without departing from the scope of embodiments.

Finally, frame/motion prediction 130 is performed on the frames using the inverse of the process utilized by the temporal-redundancy reduction 108 at the transmitter 102. For example, where MCTF is utilized by the transmitter 102, inverse MCTF is utilized by the receiver 104 to predict the original GOP 106 (using the received motion information), thereby producing a predicted GOP 132 for storage and/or display at the receiver 104.

Example Transmitter

Figure 2:
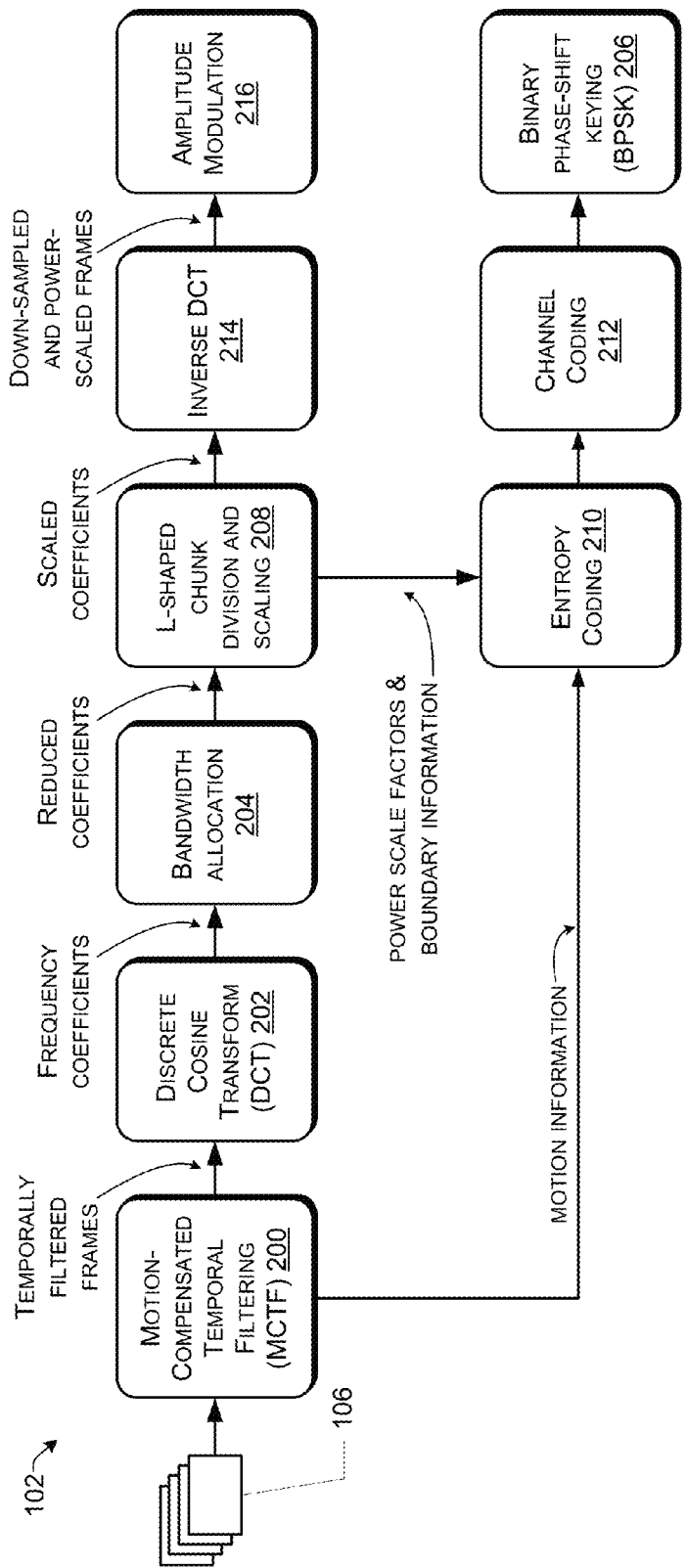
FIG. 2 is a block diagram of an example transmitter configured to transmit power-scaled video in the spatial domain via pseudo-analog transmission.

FIG. 2 is a block diagram of an example transmitter 102 configured to transmit power-scaled video in the spatial domain via pseudo-analog transmission. FIG. 2 illustrates various embodiments of the transmitter 102 in more detail.

MCTF 200, which is performed on the GOP 106 to produce temporally filtered frames, is described in more detail below with respect to FIG. 5. DCT 202 is performed on the temporally filtered frames to produce frequency coefficients.

Bandwidth Allocation

Bandwidth allocation 204 is performed in the frequency domain. Bandwidth ratio, denoted by p, is defined as the ratio of channel bandwidth to source bandwidth. In embodiments of the present disclosure, the digital transmission of motion information will occupy a certain portion of the available bandwidth. The exact amount can be computed from the result of entropy coding. When Binary Phase Shift Keying (BPSK) 206 is used, each entropy coded bit may take two complex symbols to transmit. The remaining bandwidth, denoted by the ratio $\rho_c$, is used to transmit pixels. When the ratio of remaining channel bandwidth to source bandwidth $\rho_c<1$, not all pixel values are transmitted, and the frequency domain bandwidth allocation 110 determines a bandwidth allocation on a per GOP basis.

The bandwidth allocation 204 removes coefficients from the frames in a way that results, after inverse DCT is performed, in down-sampled frames. This is based on an interesting property of DCT. Let I be an image with resolution W×H, and C be its DCT coefficients. If C is truncated into a W'×H' matrix C' by removing L-shaped lines of coefficients from the periphery of the frame in the frequency domain—where C'(w, h)=C(w, h) for all 1≤w≤W' and 1≤h≤H'—then the inverse DCT transform of C' using a W'×H' transform matrix results in $I_{W' \times H'}$, which is a down-sampled image of I. Therefore, transmitting I' instead of I achieves bandwidth reduction.

L-Chunk Division and Coefficient Scaling

L-shaped chunk division and scaling 208 is performed on the reduced number of frequency coefficients of the frames of the GOP 106. To optimally transmit the pixels under mean squared error (MSE) criterion in a power-constrained system, the pixel values are first de-correlated through transform, and then each transform coefficient is scaled by a factor which is inversely proportional to the fourth root of its variance. It is not practical to scale each coefficient individually, so chunk division is used. This breaks the coefficients into chunks and scales all coefficients in a chunk by the same factor. L-shaped chunk division and scaling 208 utilizes an L-shaped chunk division. L-shaped chunk division accommodates the frames that result from removing L-shaped lines of coefficients from the periphery of the frames during bandwidth allocation 204. Also, transform coefficients decay rapidly from low-frequency to high-frequency, and those belonging to similar frequency bands are more likely to have similar values.

Figure 3:
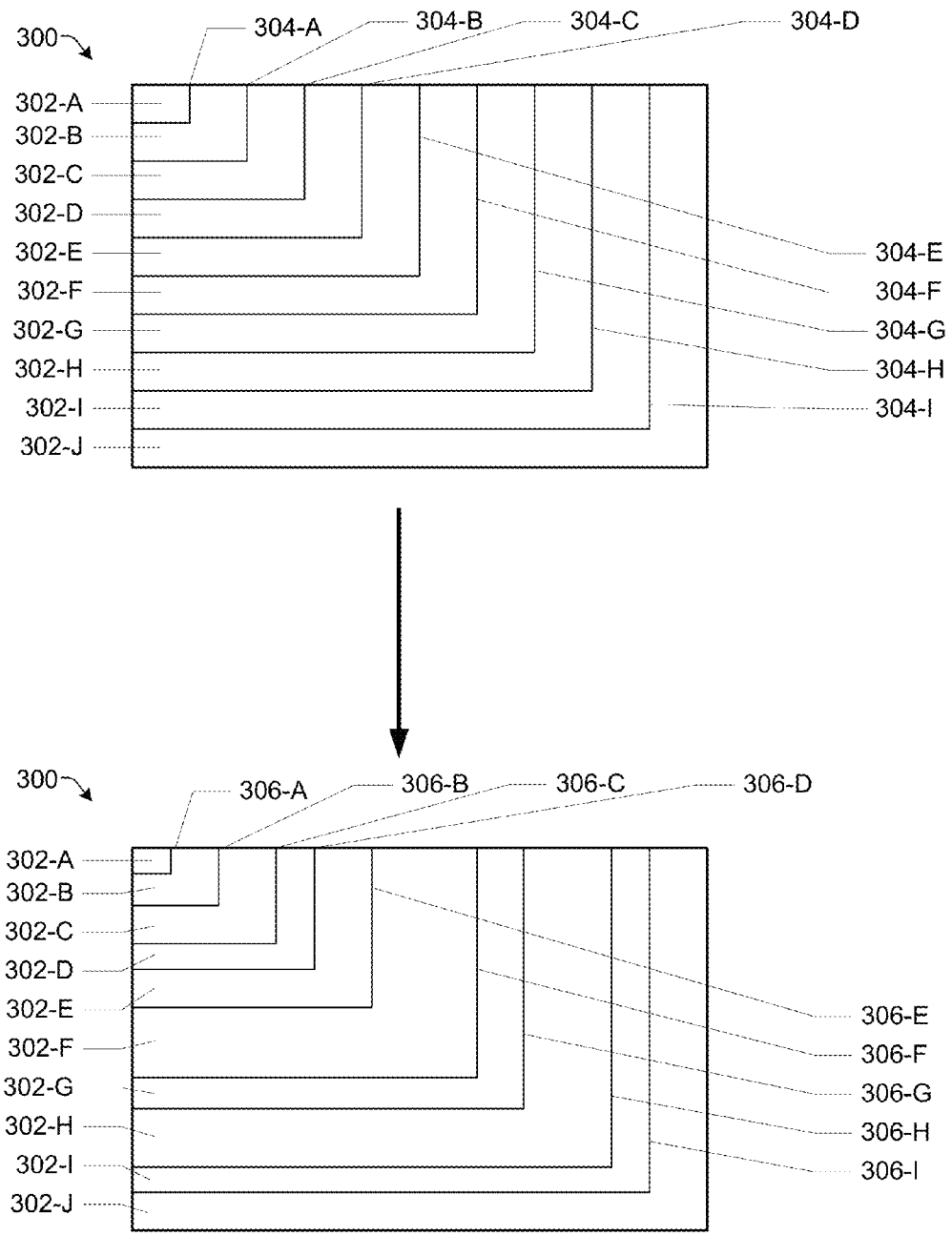
FIG. 3 is a schematic diagram of illustrative boundaries of L-shaped chunks of a video frame.

L-shaped chunk division is described with reference to FIG. 3. FIG. 3 illustrates determining boundaries of L-shaped chunks of a video frame 300. Let P be the total power budget. L-shaped chunk division and scaling 208 divides the transform coefficients into M chunks 302A-J. $\lambda_i$ and $g_i$ denote the variance and scaling factor of the $i^{th}$ chunk 302 as shown in Equation 1:

$$g_i = \lambda_i^{-\frac{1}{4}} \sqrt{\frac{P}{\sum_i \sqrt{\lambda_i}}} \qquad \text{Equation 1}$$

An optimal chunk division minimizes $\Sigma_i \sqrt{\lambda_i}$, because the resulting scaling factor $g_i$ will be maximized. In L-shaped chunk division, the adjustable parameters are $r_j$ (j=1, 2, ... M−1), which are the positions of chunk boundaries, initially established as boundaries 304A-I.

L-shaped chunk division and scaling 208 utilizes an iterative approach to search for the optimal set of $\{r_j\}$. The initial values of initial chunk boundaries 304A-I ($r'_j$s) are evenly spaced, although other initial boundaries may be used without departing from the scope of embodiments. The chunk division algorithm iteratively updates the parameters one by one. In updating $r_j$, the values of $r_{j-1}$ and $r_{j+1}$ are fixed. FIG. 3 illustrates chunk division for the frame 300 when M=10. In this case, where M=10, only 20 metadata (10 scaling factors and 10 chunk boundaries are transmitted on the digital channel; although only 9 total chunk boundaries need to be identified in order to identify all 10 L-shaped chunks, the last boundary is transmitted because, in the event that there is loss of data, the last boundary cannot be inferred from the original frame size). The final boundaries $\{r_j\}$ are labeled in FIG. 3 as 306-A-I.

Other processes may be used to determine the boundaries according to various embodiments. The ideal solution may be found, as discussed above, by minimizing the sums of the square roots of the variances. Alternatively, the iterative process described above may continue only until a non-ideal solution for the boundaries is found, such as until some threshold is met, such as a threshold sum of the square roots of the variances is met. Alternatively, the iterative process may continue until a threshold power scaling factor is achieved. In yet another embodiment, N random or non-random (pre-determined) sets of boundaries (e.g., N $\{r_j\}$) are determined, and the set of boundaries with the lowest sum of the square root of the variances is selected as the boundary for the frame. Yet other algorithms may be used to determine the M L-shaped chunks without departing from the scope of embodiments.

Once the M L-shaped chunk boundaries are determined, power scaling factors are determined for the coefficients of each chunk within each frame, such as by using Equation 1.

Referring back to FIG. 2, entropy coding 210, channel coding 212, and BPSK 206 are performed to digitally encode and transmit metadata, such as the motion information determined by MCTF 200 of the GOP as well as the power scaling factors and the boundary information determined by the L-shaped chunk division and scaling 208.

Inverse DCT 214 is performed on the power-scaled coefficients to produce pixel values. As noted above, due to characteristics of DCT, removing L-shaped lines of coefficients during bandwidth allocation 204 results in the frames being down-sampled in the spatial domain (e.g., the frames will have fewer pixel values than before they were transformed into the frequency domain by DCT 202). The power-scaled, down-sampled frames are transmitted using amplitude modulation 216. The pixel values are transmitted as densely packed discrete I and Q components in a modulation constellation. Such pseudo-analog transmission enables the video transmission to be integrated into a conventional network stack. And unlike conventional digital transmission paradigm, signal degradation in analog or pseudo-analog transmission results in a graceful degradation in video quality, and the sender does not need to know the channel quality at the receiver.

Example Receiver

Figure 4:
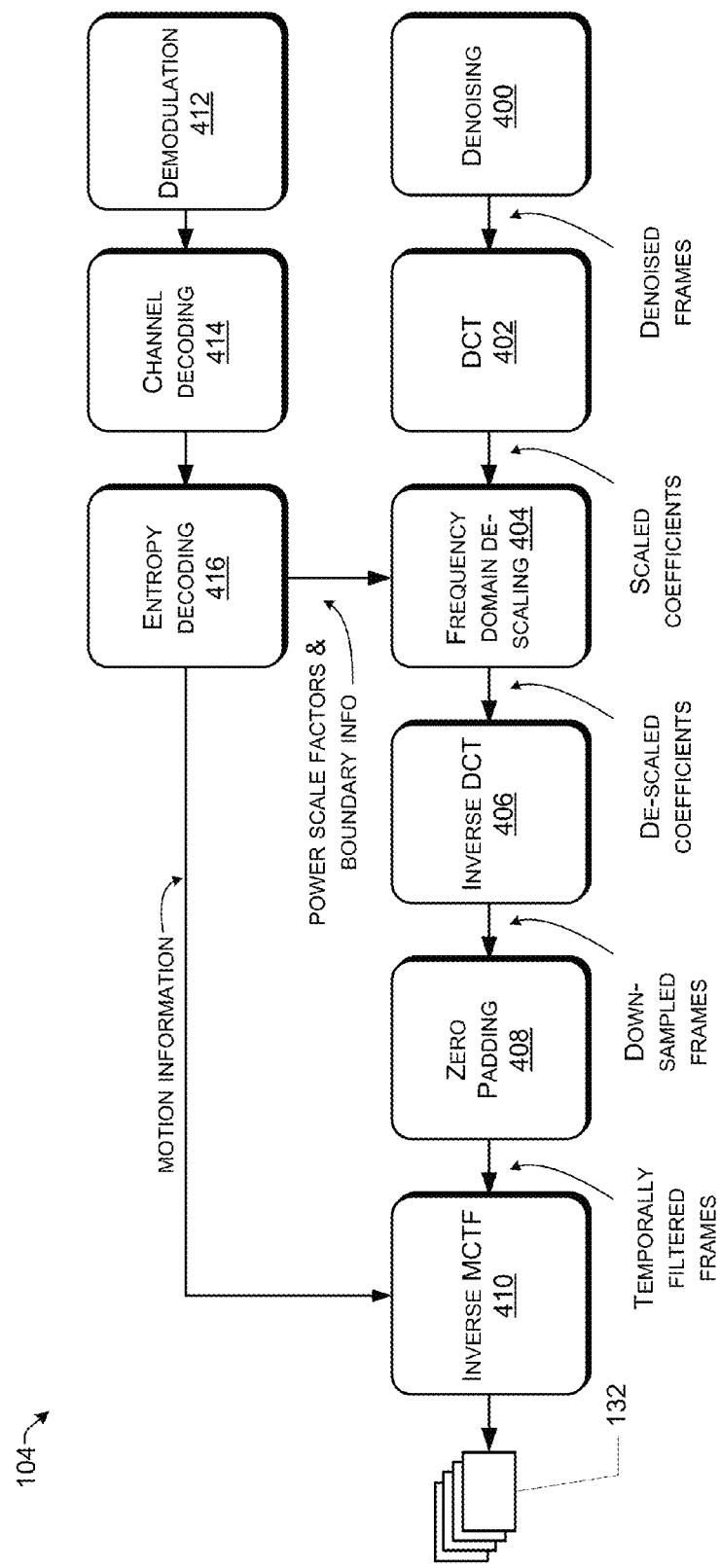
FIG. 4 is a block diagram of an example receiver configured to receive power-scaled video in the spatial domain via pseudo-analog transmission.

FIG. 4 is a block diagram of an example receiver 104 configured to receive power-scaled video in the spatial domain via pseudo-analog transmission. FIG. 4 illustrates embodiments of the receiver 104 in more detail.

Denoising 400 is performed on the received pixel values of frames of a GOP, received on a pseudo-analog signal. Source redundancy can provide channel protection under the premise that it is utilized at the receiver. Denoising is applied to channel output (e.g., to the received signals as they are received). The denoising processes for low-pass and high-pass frames are identical. Denoising 400 uses different denoising techniques to deal with packet losses and random-valued noises. In particular, a median filter is used to handle packet losses. Under ideal interleaving, packet loss creates randomly dispersed pixel "holes" in the frame. These holes are filled with the median of surrounding eight (or other number of) pixel values. More advanced median filters, such as a directional weighted median filter, are used in various embodiments, although the performance improvement over the classic median filter is marginal at moderate packet loss ratios.

BM3D is adopted to reduce random noise. The BM3D algorithm has two estimate steps: basic estimate and final estimate. Each estimate is again composed of two steps: block-wise estimate and aggregation. In a block-wise estimate, similar blocks are found for each block in a large neighborhood, and the similar blocks are stacked in a 3D array. Then, 3D transformation, hard thresholding (such as for example, Weiner filtering in the final estimate), and inverse 3D transformation are consecutively performed to generate estimates for all involved pixels. After all the blocks are processed, overlapping estimates are aggregated through a weighted sum operation.

Once denoising 400 is performed, DCT 402 is performed to transform the frames into the frequency domain. Frequency domain de-scaling 404 is performed using the power scale factors and the boundary information received via the digital channel. Inverse DCT 406 is performed on the de-scaled frames to convert them back to the spatial domain. Zero padding 408 is performed to up-sample the frames to achieve a predetermined frame size. As described elsewhere within this Detailed Description, bandwidth reduction at the transmitter 102 results in down-sampled frames; as such, the frames are increased in size at the receiver 104.

Inverse MCTF 410 is performed using the motion information received on the digital channel to predict the motion and frames of the original GOP 106 to produce predicted GOP 132.

The power scale factors, boundary information, and the motion information are received on the digital channel. Demodulation 412 is performed on the received signal. Channel decoding 414 and entropy decoding 416 are performed to determine the received digital information.

Motion-Compensated Temporal Filtering (MCTF)

MCTF is now described in the context of embodiments of the present disclosure. FIG. 5 illustrates motion-compensated temporal filtering (MCTF) 200 utilized by embodiments to reduce the temporal redundancy of a group of pictures. MCTF is essentially a motion-aligned temporal transform. It is based on an open-loop prediction model; therefore, the prediction is based on original pixel values not the reconstructed ones. Drifting errors are much smaller for MCTF than its closed-loop counterpart. (Closed-loop prediction would call for the encoder at the transmitter 102 to know the exact reconstruction that will be performed at the receiver 104; but the transmitter 102 cannot not know or predict the channel conditions at the receiver 104—unlike in conventional digital video transmission—and thus cannot know the exact reconstruction that will be performed at the receiver 104. This would result in drift error, a problem that MCTF sidesteps.)

Figure 5:
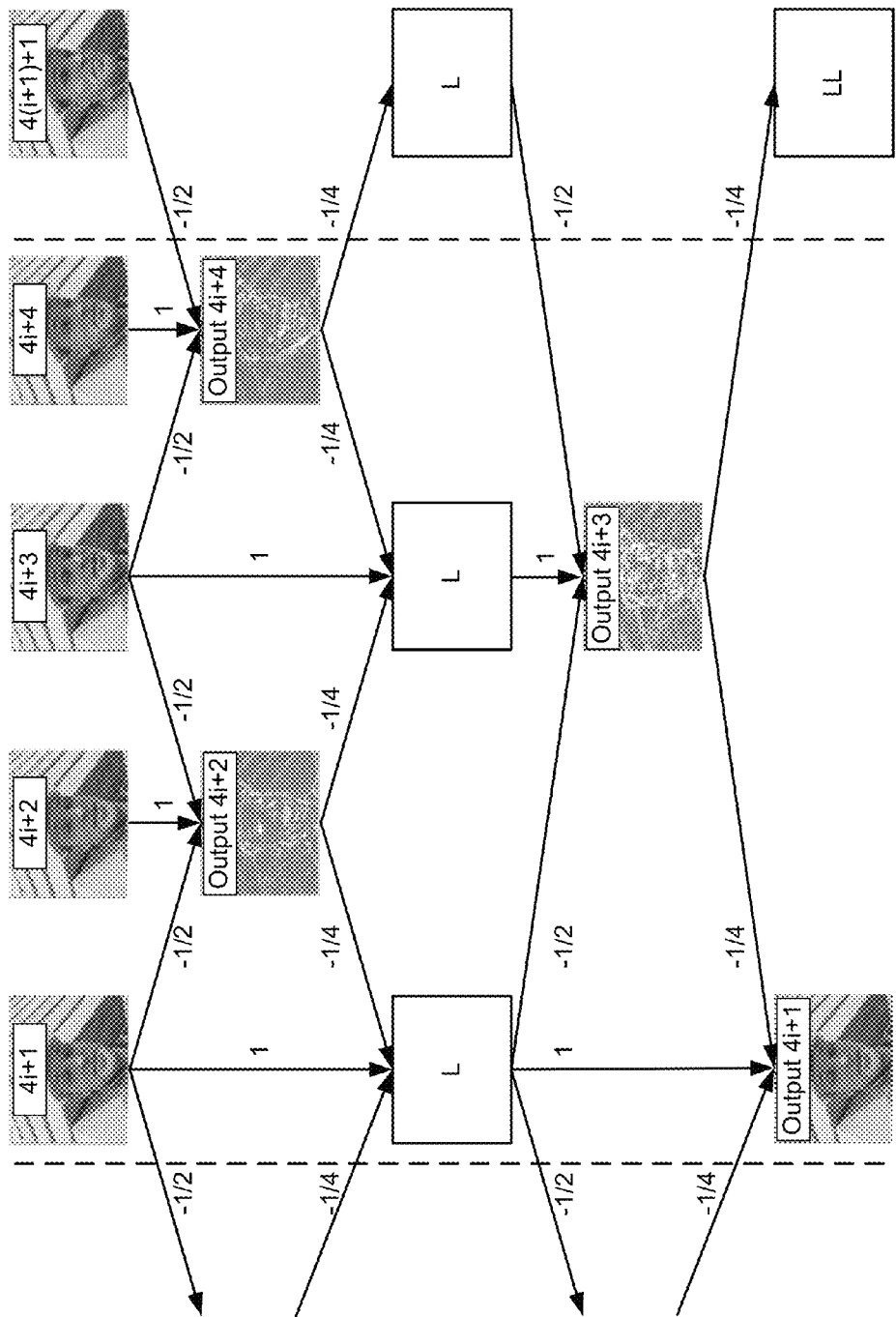
FIG. 5 is a schematic diagram of illustrative motion-compensated temporal filtering (MCTF) utilized by embodiments to reduce the temporal redundancy of a group of pictures.

FIG. 5 demonstrates the lifting structure of a 2-layer 5/3 temporal filter for the $i^{th}$ GOP when the GOP size is 4. Frames 4i+1 through 4i+4 represent a four-frame GOP. The even frames (frame 4i+2 and 4i+4) are set as high-pass frames. For each pixel block in a high-pass frame, two similar blocks are identified in the previous and following frames. The average of these two similar blocks creates a prediction of the current block, so that the high-pass components (e.g., Output 4i+2 and Output 4i+4) are computed by subtracting the predictions from the current blocks (e.g., 4i+2 and 4i+4).

After the first-layer high-pass frames are generated, the first-layer low-pass frames (denoted in FIG. 5 and "L") can be computed by adding one fourth of the high-pass components from the two adjacent frames to the current frame. Each high-pass frame is generated from 3 original frames and each low-pass frame is generated from 5 original frames, so this process is called 5/3 filter. Similar processing steps are applied to the two low-pass frames (e.g., the frames marked "L" in FIG. 5) to perform the second layer temporal filtering to produce the output low-pass frames (e.g., Output 4i+1 and Output 4i+3).

Also, the output frames are utilized to determine some of the output frames for the adjacent GOP (e.g., the frame denoted "LL" in FIG. 5.) Inverse operations are performed to reconstruct the frames at the receiver 104.

Example Operations

Figure 6:
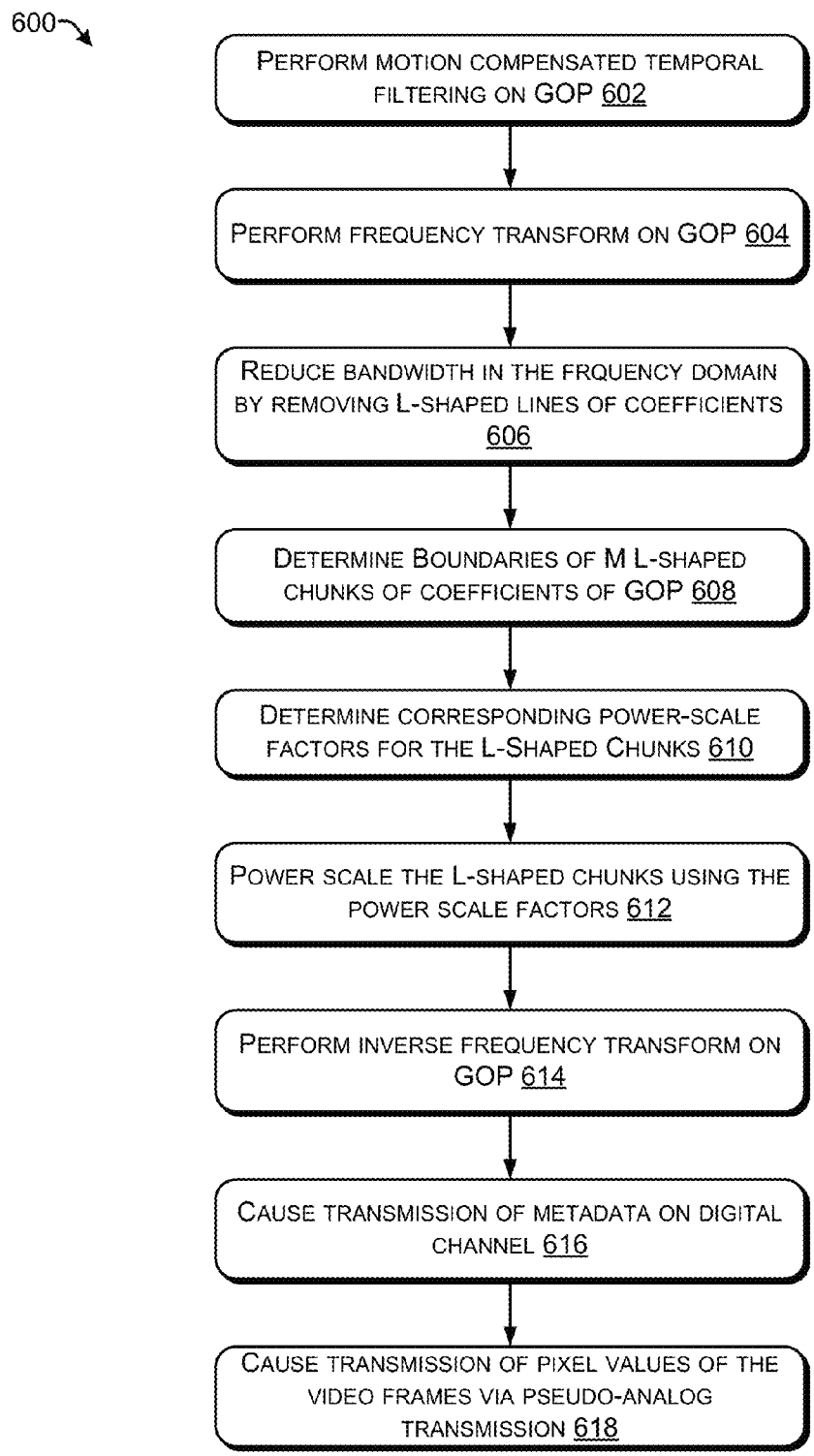
FIG. 6 is a flow diagram showing an example process for transmitting power-scaled video in the spatial domain via pseudo-analog transmission.
Figure 7:
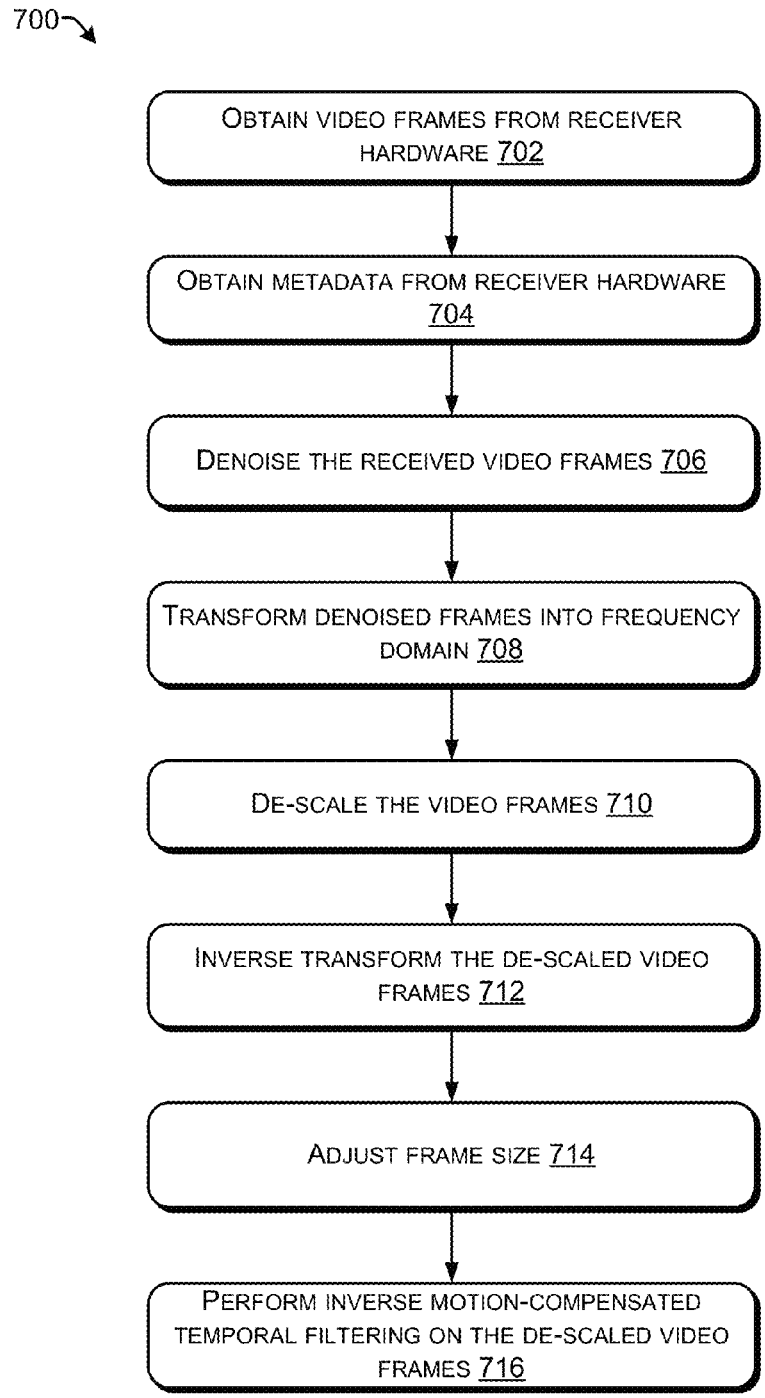
FIG. 7 is a flow diagram showing an example process for denoising and de-scaling power-scaled video received in the spatial domain via pseudo-analog transmission.

FIGS. 6 and 7 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

FIG. 6 is a flow diagram showing an example process 600 for transmitting power-scaled video in the spatial domain via pseudo-analog transmission. At 602, a transmitter, such as the transmitter 102, performs motion-compensated temporal filtering on the video frames of the GOP, such that the transmitted video frames of the GOP have reduced temporal redundancy but retain spatial redundancy.

At 604, the transmitter performs a frequency transform on the GOP to generate at least one frequency-transformed video frame. The frequency transform may be based on DCT.

At 606, the transmitter reduces bandwidth of at least one of the frames of the GOP to achieve a bandwidth budget. This is accomplished, in embodiments, by determining one or more L-shaped lines of coefficients from the at least one frequency-transformed video frame to achieve the bandwidth budget for the GOP. As discussed above, characteristics of DCT enable such coefficient removal to downsample the video frame upon it being transformed back into the spatial domain.

At 608, the transmitter determines boundaries of M L-shaped chunks of coefficients of at least one frequency-transformed video frame of the GOP, where M is an integer. The boundaries of the M L-shaped chunks of coefficients are determined based at least on variances of the coefficients of the M L-shaped chunks. In embodiments, the boundaries are determined by an iterative process that reduces or minimizes the sums of the square roots of the variances of the frequency coefficients of the M L-shaped chunks. An initial set of boundaries is determined (e.g., an initial set of boundaries that are equally spaced apart or other initial setting), and the boundaries adjusted iteratively until some condition is met, such as minimizing the sums of the square roots of the variances of the coefficients in the boundaries.

Various other processes may be used to determine the boundaries. The ideal solution may be found, as discussed above, by minimizing the sums of the square roots of the variances. Alternatively, the process may continue until a non-ideal solution for the boundaries is found, such that some threshold is met, such as a threshold sum of the square roots of the variances is met. Alternatively, the process may continue until a threshold power scaling factor is achieved, based on the chunk boundaries. In yet another embodiment, N randomly determined set of boundaries (e.g., $\{r_j\}$) is determined, and the set of the N boundaries with the lowest sum of the square root of the variances is selected. Other algorithms may be used to determine the M L-shaped chunks without departing from the scope of embodiments.

At 610, the transmitter determines corresponding power scale factors for corresponding ones of the M L-shaped chunks of coefficients. The power scale factors are determined based at least partly on the variances of the coefficients of the M L-shaped chunks, such as by using equation 1.

At 612, the transmitter scales the corresponding ones of the M L-shaped chunks of coefficients of the at least one frequency-transformed video frame using the corresponding power scale factors. This generates at least one power-scaled video frame of the GOP in the frequency domain. As noted above, the power-scaled video frame may also be bandwidth-reduced.

At 614, inverse frequency transform is performed on the GOP to produce pixel values, e.g., power-scaled and/or down-sampled video frames in the spatial domain.

At 616, the transmitter causes transmission, on a digital channel, using digital encoding, of metadata associated with the GOP. The metadata includes one or more of motion information produced by the MCTF, boundary information from L-shaped chunk division, and power scale factors for the L-shaped chunks.

At 618, the transmitter causes transmission, on a pseudo-analog channel, pixel values of video frames of the GOP, e.g., pixel values of at least one power-scaled video frame of the GOP transformed to the spatial domain. This may include transmitting the pixel values as discrete constellation values of complex symbols via amplitude modulation.

FIG. 7 is a flow diagram showing an example process 700 for denoising and de-scaling power-scaled video received in the spatial domain via pseudo-analog transmission. At 702, a receiver—such as the receiver 104—obtains from receiver hardware video frames of a group of pictures (GOP) transmitted in the spatial domain (e.g., pixel values). The video frames are received on a pseudo-analog channel as pixel values encoded as discrete constellation values of complex symbols.

At 704, the receiver obtains, from the receiver hardware via a digital channel, scaling factors and boundaries of M L-shaped chunks of coefficients corresponding to the video frames, the scaling factors received from the transmission. The receiver also obtains other metadata via the digital channel, such as motion information.

At 706, the receiver denoises the received video frames. Denoising may include denoising for loss packets, as well as denoising to compensate for introduced noise. In embodiments, a classic median filter is utilized to denoise for packet loss compensation, although other denoising filters may be used. In embodiments, BM3D denoising may be utilized to compensate for noise introduced into the pseudo-analog signal. As note elsewhere within this Detailed Description, the denoising is based on spatial redundancy preserved in the video frames at the transmitter.

At 708, the receiver transforms the de-noised video frames to the frequency domain from the spatial domain to produce frequency coefficients. In embodiments, DCT is utilized to transform the frames into the frequency domain.

At 710, the receiver de-scales the M L-shaped chunks of coefficients of the video frames using the scaling factors and the boundaries to produce de-scaled video frames. The frequency coefficients inside each of the M L-shaped chunks are identified based on the boundary information, and the frequency coefficients in the chunks are de-scaled by the power scale factor that corresponds to that particular chunk.

At 712, the receiver inverse transforms the de-scaled video frames to produce de-scaled video frames in the spatial domain. As noted elsewhere within this Detailed Description, the transmitter may have down-sampled the transmitted video frames. Thus, at 714, the frame sizes of the video frames are adjusted, such that the video frames are a predetermined size. In embodiments, this may include padding at least one of the de-scaled video frames with zeros to increase its size to the predetermined video frame size.

AT 716, the receiver performs MCTF on the de-scaled video frames to predict the original video frames of the GOP. The MCTF utilizes the motion information that corresponds to the GOP and that are received via the digital channel.

Example Computing Device

Figure 8:
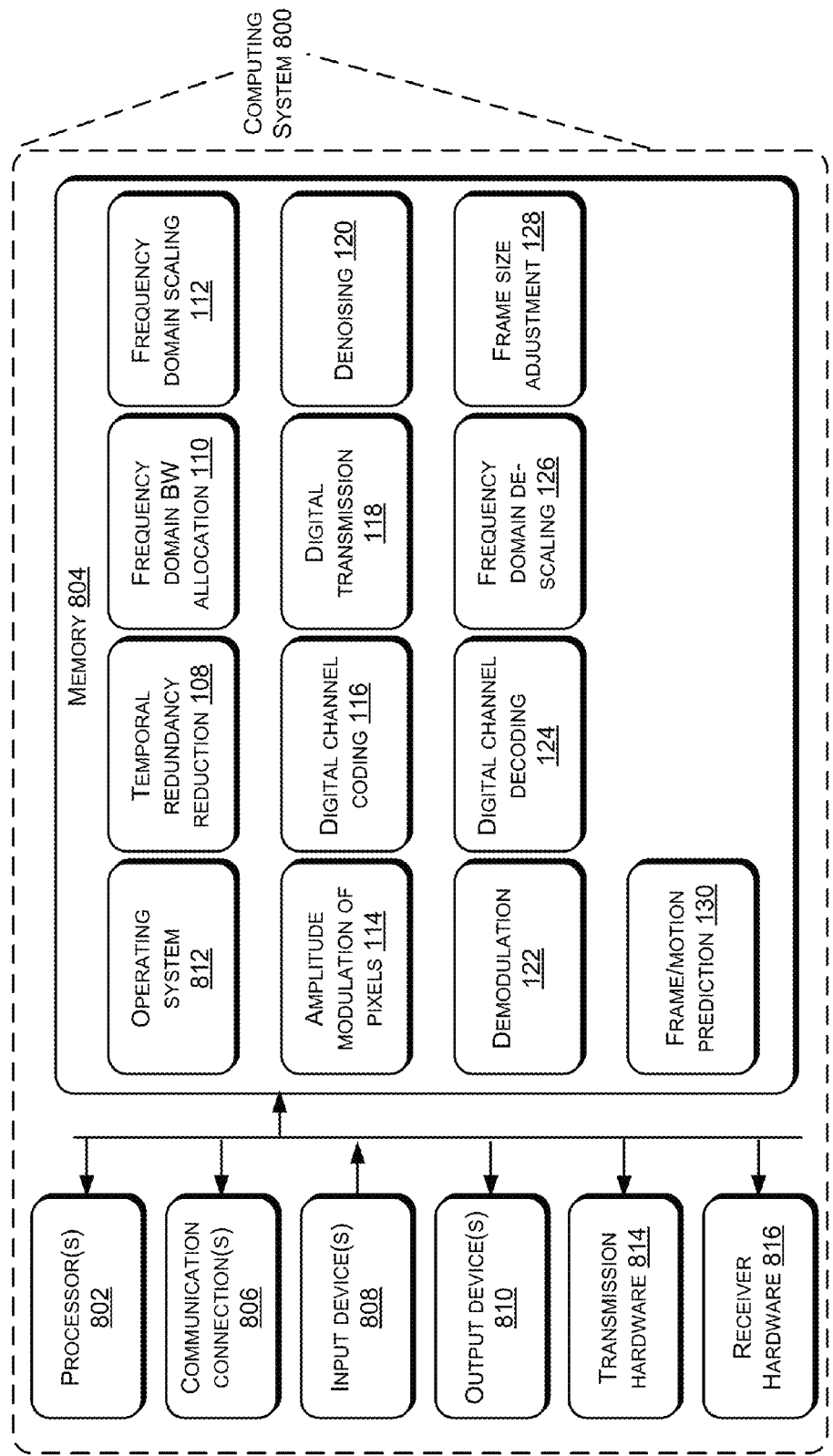
FIG. 8 is a block diagram of an example computing system usable to perform various methods described herein.

FIG. 8 is a block diagram of an example computing system usable to perform various methods described herein. The computing system 800 may be configured as any suitable computing device capable of implementing all or part of a video transmission environment. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of the video transmission and reception described herein.

In one example configuration, the computing system 800 comprises one or more processors 802 and memory 804. The computing system 800 may also contain communication connection(s) 806 that allow communications with various other systems. The computing system 800 may also include one or more input devices 808, such as a keyboard, mouse, pen, voice input device, touch input device, etc., and one or more output devices 810, such as a display, speakers, printer, etc. coupled communicatively to the processor(s) 802 and the memory 804.

The memory 804 may store program instructions that are loadable and executable on the processor(s) 802, as well as data generated during execution of, and/or usable in conjunction with, these programs. In the illustrated example, memory 804 stores an operating system 812, which provides basic system functionality of the computing system 800 and, among other things, provides for operation of the other programs and modules of the computing system 800.

The memory 804 includes various aspects of either a video transmitter or receiver (e.g., either or both aspects of the transmitter 102 and the receiver 104). Some of these aspects may be implemented as software modules, or as hardware components, such as in transmission hardware 814 and/or the receiver hardware 816.

Computer-Readable Media

Depending on the configuration and type of computing device used, memory 804 of the computing system 800 in FIG. 8 may include volatile memory (such as random access memory (RAM)) and/or non-volatile memory (such as read-only memory (ROM), flash memory, etc.). Memory 804 may also include additional removable storage and/or non-removable storage including, but not limited to, flash memory, magnetic storage, optical storage, and/or tape storage that may provide non-volatile storage of computer-readable instructions, data structures, program modules, and other data for computing system 800.

Memory 804 is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method, comprising:
   determining initial boundaries of M upper-case L-shaped chunks of coefficients of at least one frequency-transformed video frame of a group of pictures (GOP), where M is an integer, wherein each of the M upper-case L-shaped chunks of coefficients is bound at least by a common pair of adjacent boundaries of the at least one frequency-transformed video frame;
   determining boundaries of the M upper-case L-shaped chunks of coefficients, wherein the boundaries of the M upper-case L-shaped chunks of coefficients are determined based at least partly on variances of the coefficients of the M upper-case L-shaped chunks, and wherein the boundaries of the M upper-case L-shaped chunks of coefficients are determined such that the sums of the square roots of the variances of the coefficients of the M upper-case L-shaped chunks are lower than sums of the square roots of the variances of the coefficients of the initial boundaries of the M upper-case L-shaped chunks;
   determining corresponding power scale factors for corresponding ones of the M upper-case L-shaped chunks of coefficients, the power scale factors determined based at least partly on the variances of the coefficients of the M upper-case L-shaped chunks;
   scaling corresponding ones of the M upper-case L-shaped chunks of coefficients of the at least one frequency-transformed video frame using the corresponding power scale factors to generate at least one power-scaled video frame of the GOP in the frequency domain; and
   transmitting, on a pseudo-analog channel, pixel values of video frames of the GOP, including pixel values of the at least one power-scaled video frame of the GOP transformed to a spatial domain.

2. The method of claim 1, further comprising:
   performing a frequency transform on the GOP to generate at least the frequency-transformed video frame; and
   performing motion-compensated temporal filtering on the video frames of the GOP, prior to performing the frequency transform, such that the transmitted video frames of the GOP have reduced temporal redundancy.

3. The method of claim 1, wherein the transmitted video frames of the GOP retain spatial redundancy.

4. The method of claim 3, wherein the transmitted video frames of the GOP have reduced temporal redundancy between individual ones of the power-scaled video frames of the GOP.

5. The method of claim 1, further comprising transmitting, on a digital channel that is separate from the pseudo-analog channel, at least the corresponding power scale factors.

6. The method of claim 1, wherein the transmitting pixel values of video frames of the GOP on the pseudo-analog channel includes transmitting the pixel values as discrete constellation values of complex symbols via amplitude modulation.

7. The method of claim 1, wherein the boundaries of the M upper-case L-shaped chunks of frequency coefficients are iteratively determined such that the sums of the square roots of the frequency coefficients of the M upper-case L-shaped chunks are minimized.

8. The method of claim 1, further comprising removing, prior to determining the boundaries of the M upper-case L-shaped chunks of coefficients, one or more upper-case L-shaped lines of coefficients from the at least one frequency-transformed video frame to achieve a bandwidth budget for the GOP, such that the at least one power-scaled video frame is a down-sampled and power-scaled video frame.

9. A video transmission system comprising:
one or more memories;
one or more processors;
transmission hardware; and
a plurality of computer-executable instructions stored on the one or more memories and executable by the one or more processors to:
perform motion-compensated temporal filtering on video frames of a group of pictures (GOP) to reduce inter-frame redundancy of the video frames within the GOP;
transform the video frames from a spatial domain to a frequency domain, upon performance of the motion compensated temporal filtering, to produce frequency coefficients of the video frames of the GOP;
determine initial boundaries of M upper-case L-shaped chunks of coefficients of at least one frequency-transformed video frame of a group of pictures (GOP), where M is an integer, wherein each of the M upper-case L-shaped chunks of coefficients is bound at least by a common pair of adjacent boundaries of the at least one frequency-transformed video frame;
determine, for at least one video frame of the video frames, boundaries of the M upper-case L-shaped chunks of the frequency coefficients, wherein the M upper-case L-shaped chunks of coefficients are successively contiguous over the at least one video frame, and wherein the boundaries of the M upper-case L-shaped chunks of coefficients are determined such that the sums of the square roots of the variances of the coefficients of the M upper-case L-shaped chunks are lower than sums of the square roots of the variances of the coefficients of the initial boundaries of the M upper-case L-shaped chunks;
power scale the at least one video frame using power scale factors determined from at least the variances of the frequency coefficients of the M upper-case L-shaped chunks to produce a power-scaled video frame in the frequency domain;
inverse transform the video frames, including the power-scaled video frame, back into the spatial domain; and
cause the transmission hardware to transmit, via a pseudo-analog channel, pixel values of the video frames, including pixel values of the power-scaled video frame.

10. The video transmission system of claim 9, wherein the video frames of the GOP retain spatial redundancy.

11. The video transmission system of claim 9, wherein the plurality of computer-executable instructions are further executable by the one or more processors to cause the transmission hardware to transmit the power scale factors and the boundaries of the M upper-case L-shaped chunks on a digital channel that is separate from the pseudo-analog channel.

12. The video-transmission system of claim 11, wherein the plurality of computer-executable instructions are further executable by the one or more processors to cause the transmission hardware to transmit motion information determined by the motion-compensated temporal filtering on the digital channel.

13. A system comprising:
receiver hardware;
one or more processors; and
one or more computer-readable media storing instructions that are executable by one or more processors to cause the system to:
obtain, from the receiver hardware, video frames of a group of pictures (GOP) in a spatial domain, the video frames received from a transmission system by the receiver via a pseudo-analog channel;
obtain, from the receiver hardware, scaling factors and boundaries of M upper-case L-shaped chunks of coefficients corresponding to the video frames, at least one of the M upper-case L-shaped chunks being different in size relative to at least one other of the M upper-case L-shaped chunks, each of the boundaries of the M upper-case L-shaped of coefficients being upper-case L-shaped and terminating at a common pair of adjacent boundaries of the video frames, the scaling factors received from the transmission system by the receiver hardware via a digital channel, and wherein the boundaries of the M upper-case L-shaped chunks of coefficients are such that the sums of the square roots of the variances of the coefficients of the M upper-case L-shaped chunks are lower than sums of the square roots of the variances of coefficients of initial boundaries of the M upper-case L-shaped chunks;
transform the video frames to a frequency domain from the spatial domain to produce frequency coefficients of the video frames of the GOP;
de-scale the M upper-case L-shaped chunks of coefficients of the video frames using the scaling factors and the boundaries to produce descaled video frames; and
inverse transform the de-scaled video frames to produce de-scaled video frames in the spatial domain.

14. The system of claim 13, wherein the instructions are further executable by the one or more processors to cause the system to denoise the received video frames, prior to transforming the video frames to a frequency domain from the spatial domain, based on spatial redundancy preserved in the video frames by the transmission system.

15. The system of claim 13, wherein the instructions are further executable by the one or more processors to cause the system to pad at least one of the de-scaled OCT coefficients with zeros to increase a size of the at least one of the de-scaled video frames to a predetermined video frame size.

16. The system of claim 13, wherein the instructions are further executable by the one or more processors to cause the system to:
obtain, from the receiver hardware, motion information corresponding to original video frames of the GOP; and
perform inverse motion-compensated temporal filtering on the de-scaled video frames to predict the original video frames of the GOP.

17. The system of claim 13, wherein the video frames of the GOP are received by the receiver hardware of the pseudo-analog channel as pixel values encoded as discrete constellation values of complex symbols.

18. The method of claim 1, wherein at least one of the M upper-case L-shaped chunks is different in size relative to at least one other of the M upper-case L-shaped chunks.

* * * * *